3,475,510
ETHYLENE AND SYNTHESIS GAS PROCESS
Julian Newman, East Meadow, and Simon Mencher, New York, N.Y., assignors to The Lummus Company, New York, N.Y., a corporation of Delaware
No Drawing. Filed Apr. 13, 1966, Ser. No. 542,203
Int. Cl. C07c 3/18
U.S. Cl. 260—683                                   4 Claims

ABSTRACT OF THE DISCLOSURE

Process for increasing the hydrogen and carbon monoxide content in the effluent resulting from the cracking of a feed containing ethane, propane, or naphtha wherein a feed containing less than 150 p.p.m. sulfur is cracked in a nickel-chromium alloy tube at an outlet temperature of 1400–1600° F., pressure of 20–75 p.s.i.a. and residence time of 0.2–1.5 seconds.

---

This invention relates generally to the treatment of hydrocarbon feedstocks such as ethane, propane and naphtha and, more particularly, the invention relates to the control of operating variables in the cracking of ethane, propane and naphtha feeds and the like for the simultaneous recovery of ethylene and the production of a hydrogen rich synthesis gas. The process of the invention is characterized by elimination of the primary reformer normally required for ammonia synthesis, by elimination of the need for proprietary catalysts used in conventional high pressure reforming, and by a high quality gasoline product stream.

Heretofore, the construction and operation of cracking heaters for treatment of hydrocarbon feeds has been determined by the particular end-product desired. Thus, essentially different processes have been used depending on whether ethylene, hydrogen, carbon monoxide or other lighter fractions were the principal end-products.

Further, the effect of sulfur in the hydrocarbon feed has been extensively investigated, with the result that some feeds are desulfurized before cracking while it is deliberately added to others. The tendency of sulfur to deactivate certain catalytic materials is notorious. Also, it is known that small amounts of sulfur, from about 0.0001% to 0.03%, cause carbon deposition and increase corrosion rates. Use of sulfur is advocated, for example, in U.S. Patent No. 2,621,216.

It is a general object of the present invention to provide an improved process for producing ethylene and synthesis gas.

Another object of the present invention is to provide a process wherein ethylene and hydrogen rich synthesis gas can be produced simultaneously in the same heater.

A further object of the present invention is to provide a synthesis gas that need not be passed to a primary reformer.

Another object of the present invention is to provide a naphtha cracking process wherein proprietary catalysts are not required.

Various other objects and advantages of the invention will become clear from the following discussion of several embodiments thereof, and the novel features will be particularly pointed out in connection with the appended claims.

The present invention is based on the discovery that a product stream separable into ethylene and synthesis gas streams can be produced by cracking a desulfurized naphtha under particular operating conditions. As used herein, the term "desulfurized" is intended to mean less than that occuring naturally, i.e., less than about 150 p.p.m. It has been determined that while the presence of sulfur has little or no effect on ethylene yield, the distribution of other products is significantly effected. Thus, the usual product distribution of a naphtha feed containing sulfur when cracked thermally in the presence of steam is as follows:

|  | Wt. percent |
|---|---|
| Carbon monoxide | 0.2 |
| Carbon dioxide | 0.0 |
| Hydrogen | 1.2 |
| Methane | 19.6 |
| Ethylene | 34.1 |
| Ethane and heavier | 44.9 |
|  | 100.0 |

In accordance with the present invention, a desulfurized feed is rapidly passed through nickel-chromium alloy tubes at high temperatures and in the presence of steam, and an entirely different product distribution results. A typical yield is as follows:

|  | Wt. percent |
|---|---|
| Carbon monoxide | 43.5 |
| Carbon dioxide | Low |
| Hydrogen | 5.8 |
| Methane | 23.2 |
| Ethylene | 30.1 |
| Ethane and heavier | 3.1 |
|  | 105.7 |

To produce such a product distribution, conditions in the furnace fall within the following ranges: Outlet temperatures is 1400° to 1600° F., pressure is 20–75 p.s.i.a., residence time is 0.2 to 1.5 seconds, and the steam/oil ratio is 0.2 to 1.5. High-nickel austenitic stainless steel alloys are preferred for the tubes. One such alloy is 314 stainless, with the following composition:

|  | Wt. percent |
|---|---|
| Nickel | 19–22 |
| Chromium | 23–26 |
| Carbon, max. | 0.25 |
| Manganese, max. | 2.0 |
| Silicon | 1.5–3.0 |

Of course, other alloys may also be employed. The effluent stream of the above composition, is quenched in the normal manner and passed to a fractionator where the ethylene and heavier components are separated out as a bottom product. This bottom product is generally fractionated into normal product streams, i.e., ethane, propane, propylene, butanes, gasoline and fuel oil, but can also be recycled, as noted below. The overhead stream has the following typical composition:

|  | Mol. percent |
|---|---|
| Carbon dioxide | 1.8 |
| Carbon monoxide | 26.0 |
| Hydrogen | 48.1 |
| Methane | 24.1 |
|  | 100.0 |

If desired, the methane concentration of this stream can be lowered by chilling in a demethanizer feed train. This stream is further catalytically processed by known methods to produce the desired ratios of nitrogen and hydrogen required for ammonia synthesis or other products.

As noted above, it is possible to produce an overhead product which can be passed directly to a secondary reformer, without going through the primary reformer. The pyrolysis conditions, pyrolysis effluent composition and fractionator overhead composition typical of such operation are set forth hereinbelow in Table I.

TABLE I

Operating conditions:
- Outlet temperature ° F__ 1584
- Pressure __p.s.i.a__ 28
- Residence time __second__ 0.6
- Steam/oil ratio (by weight) __ 0.48

Effluent composition: Wt. percent
- Carbon dioxide __ 3.6
- Carbon monoxide __ 33.0
- Hydrogen __ 4.4
- Methane __ 17.6
- Ethylene __ 22.8
- Ethane and heavier __ 18.6

Fractionator overhead composition: Mol. percent
- Carbon dioxide __ 1.8
- Carbon monoxide __ 26.0
- Hydrogen __ 48.1
- Methane __ 24.1

100.0

Further, it is possible to controllably vary the ratio of synthesis gas to ethylene through control of the operating variables in the ethylene cracking heater, because ethylene yield is essentially directly proportional to the severity of cracking. Two typical sets of operating conditions are set forth below in Table II.

TABLE II

|  | Ethylene:syngas=1.07 | Ethylene:syngas=0.24 |
|---|---|---|
| Outlet temp., ° F | 1,559 | 1,584 |
| Pressure, p.s.i.a | 25.2 | 28.3 |
| Residence time, sec | 0.5 | 0.6 |
| Steam/oil ratio | 0.48 | 0.48 |

It will be noted that conditons for both ethylene:syngas ratios fall within the broad ranges noted above.

Pressures normally employed in ethylene cracking heaters are generally on the order of 30 p.s.i.a. As is obvious, any increase in this pressure produces a corresponding saving in effluent compression requirements. The higher severity of operation in accordance with the present invention allows pressure to be increased to 50 p.s.i.a. while still obtaining good yields. Lowering the pressure will increase the ethylene yield and ethylene/syngas ratio.

Disposal of the fractionator bottom product (ethylene and heavier) again depends on whether emphasis is on ethylene or syngas production. Thus, after separation of the ethylene, the $C_3$ and lighter remainder can be recycled to separate furnaces, whereby ethylene production is maximized, or the entire bottoms stream can be passed to separate reformers to maximize ammonia production. Alternatively, of course, a normal fractionation can be followed giving separate ethane, propane, propylene, butanes, gasoline and fuel oil fractions which can be used directly as products. In this connection, it is to be noted that the gasoline product stream is extremely aromatic and may be used as +100 octane fuel or for aromatics recovery. The composition of a typical gasoline fraction produced in this manner is set forth in Table III.

TABLE III

| Component: | Wt. percent |
|---|---|
| $C_5$'s | 9.4 |
| Benzene | 53.7 |
| Toluene | 18.6 |
| Xylenes and ethylbenzene | 2.1 |
| Total aromatics | 86.5 |

It will be understood that various changes in the details, steps, materials and arrangements of parts, which have herein been described and illustrated in order to explain the nature of the invention, may be made by those skilled in the art within the principle and scope of the invention as defined in the appended claims.

What is claimed is:

1. In the cracking of a hydrocarbon feed containing a member selected from the group consisting of ethane, propane and naphtha, a process for increasing the hydrogen and carbon monoxide content of the cracking effluent comprising:

passing said feed, having a sulfur content less than about 150 parts per million and dilution steam, through a cracking heating zone in contact with a nickel-chromium alloy, the residence time of said feed within said cracking zone being about 0.2–1.5 seconds, outlet temperature being within the range of 1400° to 1600° F. and pressure being in the range of about 20 to 75 p.s.i.a.;

quenching the effluent from said zone; and passing said effluent to a separation zone and recovering therefrom an ethylene and heavier first fraction and a hydrogen and carbon monoxide-containing second fraction as separate products.

2. The process as claimed in claim 1, wherein the steam:hydrocarbon ratio is within the range of 0.2 to 1.5.

3. The process as claimed in claim 1, wherein the hydrogen content of said second fraction is at least 40 mol. percent.

4. The process as claimed in claim 1, wherein said separation zone comprises a fractionating tower, said first fraction being a liquid bottoms product and said second fraction being a gaseous overhead.

References Cited

UNITED STATES PATENTS

| 2,263,557 | 11/1941 | Greenewalt | 260—683 |
| 2,672,489 | 3/1954 | Holland | 260—683 |
| 3,180,904 | 4/1965 | Fischer et al. | 260—683 |
| 3,236,615 | 2/1966 | Lipkin | 260—683 |
| 3,248,441 | 4/1966 | Soderquist et al. | 260—683 XR |
| 3,291,573 | 12/1966 | Frescoln | 260—683 XR |

DELBERT E. GRANTZ, Primary Examiner

C. E. SPRESSER, Assistant Examiner

U.S. Cl. X.R.

208—130; 252—373